US010215326B2

(12) United States Patent
Fournel

(10) Patent No.: US 10,215,326 B2
(45) Date of Patent: Feb. 26, 2019

(54) SUPPORT ELEMENT, CORRESPONDING CRYOGENIC FLUID CIRCUIT AND CORRESPONDING METHOD

(71) Applicant: L'Air Liquide, Societe Anonyme pour l'Etude et l'Exploitation des Procedes Georges Claude, Paris (FR)

(72) Inventor: Jean-Luc Fournel, Silly-sur-Nied (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 251 days.

(21) Appl. No.: 15/039,554

(22) PCT Filed: Sep. 30, 2014

(86) PCT No.: PCT/FR2014/052464
§ 371 (c)(1),
(2) Date: May 26, 2016

(87) PCT Pub. No.: WO2015/079130
PCT Pub. Date: Jun. 4, 2015

(65) Prior Publication Data
US 2017/0159871 A1    Jun. 8, 2017

(30) Foreign Application Priority Data
Nov. 26, 2013    (FR) ...................... 13 61622

(51) Int. Cl.
*F16L 59/14*    (2006.01)
*F25D 19/00*    (2006.01)
(Continued)

(52) U.S. Cl.
CPC ............... *F16L 59/141* (2013.01); *F16L 9/19* (2013.01); *F16L 39/005* (2013.01);
(Continued)

(58) Field of Classification Search
CPC ....... H01B 12/14; H01B 12/12; F16L 59/141; F16L 39/005; F16L 59/065; F16L 5/14; F16L 59/14
See application file for complete search history.

(56) References Cited

U.S. PATENT DOCUMENTS 3,721,101 A    3/1973    Sheppard et al.
3,781,733 A    12/1973    Heim
(Continued)

FOREIGN PATENT DOCUMENTS

EP    1 619 436    1/2006

OTHER PUBLICATIONS

International Search Report and Written Opinion for PCT/FR2014/052464, dated Mar. 2, 2015.
(Continued)

*Primary Examiner* — Brian M King
(74) *Attorney, Agent, or Firm* — Christopher J. Cronin

(57) ABSTRACT

Support element and method for a cryogenic fluid circuit comprising a plurality of orifices intended for the passage of cryogenic-fluid transfer pipes, said support element comprising at least one thermal path formed between two adjacent orifices, the thermal path comprising a blind opening, the opening being delimited by two spaced-apart walls extending between two ends in a longitudinal direction perpendicular to the plane of the orifices, the two walls being joined together by an end wall, the support element being characterized in that it comprises a first set of orifices which is surrounded by a first thermal path and a second set of orifices, the first thermal path being situated between the first set of orifices and the second set of orifices, which means to say that the first thermal path is in thermal and mechanical
(Continued)

connection with, on the one hand, all the orifices of the first set of orifices and, on the other hand, all the orifices of the second set of orifice.

16 Claims, 2 Drawing Sheets

(51) Int. Cl.
| | | |
|---|---|---|
| *F16L 59/12* | (2006.01) | |
| *F16L 9/19* | (2006.01) | |
| *F16L 39/00* | (2006.01) | |
| *F16L 59/065* | (2006.01) | |
| *F28F 13/00* | (2006.01) | |

(52) U.S. Cl.
CPC ........... *F16L 59/065* (2013.01); *F16L 59/123* (2013.01); *F25D 19/006* (2013.01); *F28F 13/00* (2013.01); *F28F 2270/02* (2013.01)

(56) References Cited

U.S. PATENT DOCUMENTS

| | | | | |
|---|---|---|---|---|
| 3,904,394 A | * | 9/1975 | Prast | F16L 59/065 138/108 |
| 4,036,617 A | * | 7/1977 | Leonard | F16L 7/00 138/112 |
| 5,385,026 A | * | 1/1995 | Zhang | F17C 13/083 62/50.7 |
| 5,570,723 A | * | 11/1996 | Hwang | F16L 7/00 138/106 |
| 2015/0219243 A1 | * | 8/2015 | Kumar | F16L 11/127 138/114 |

OTHER PUBLICATIONS

French Search Report and Written Opinion for FR 1 361 622, dated Sep. 3, 2014.

* cited by examiner

SUPPORT ELEMENT, CORRESPONDING CRYOGENIC FLUID CIRCUIT AND CORRESPONDING METHOD

CROSS-REFERENCE TO RELATED APPLICATIONS

This application is a § 371 of International PCT Application PCT/FR2014/052464, filed Sep. 30, 2014, which claims § 119(a) foreign priority to French patent application FR1361622, filed Nov. 26, 2013.

BACKGROUND

Field of the Invention

The present invention relates to a support element for a cryogenic fluid circuit and also to a circuit and a method comprising such a support element.

The invention relates more particularly to a support element for a cryogenic fluid circuit comprising a plurality of orifices provided for the passage of respective pipes for transferring cryogenic fluid, said support element comprising at least one thermal path formed between two adjacent orifices, the thermal path comprising a blind duct formed between the two adjacent orifices, the duct being delimited by two spaced-apart walls, each wall extending between two ends in a longitudinal direction perpendicular to the plane of the orifices, first ends of the walls being connected to two adjacent orifices, respectively, the second ends of the two walls being connected together via an end wall.

Related Art

In order to pass gas or liquid into and out of cryogenic circuits, it is known practice to use thermal paths (also referred to as "thermal barriers").

These mechanical devices extend the mechanical conduction path between two mechanically connected points which are at different temperatures. These thermal paths use welded tubes that maintain spacings between the two points to be mechanically connected.

When the circuit comprises several pipes at different temperatures, it is necessary to provide as many individual outlets as there are thermal paths. This requires the provision of a large number of holes in the corresponding partition. The mechanical strength of the assembly is impaired. This is because the resistance to bending moment of one or more thermal paths is relatively low.

SUMMARY OF THE INVENTION

It is an aim of the present invention to remedy all or some of the drawbacks of the prior art that were listed above.

To this end, the support element according to the invention, which is otherwise in accordance with the generic definition given in the above preamble, is essentially characterized in that it comprises a first set of orifices surrounded by a first thermal path and a second set of orifices, the first thermal path being situated between the first set of orifices and the second set of orifices, i.e. the first thermal path is thermally and mechanically connected to all of the orifices of the first set of orifices, on one side, and all of the orifices of the second set of orifices, on the other side.

This architecture makes it possible to group the pipes (corresponding orifices) on one and the same support element in groups of similar temperatures, while reducing the number of thermal paths. The device also makes it possible to reduce the number of holes compared with the prior art and to increase the mechanical strength of the assembly.

The solution is also less expensive to manufacture and less bulky. The solution also makes it possible to limit thermal losses compared with the solutions of the prior art.

Furthermore, embodiments of the invention can comprise one or more of the following features:

- the support element comprises a second thermal path, the second thermal path being disposed between the second set of orifices and a peripheral border of the support element, the second thermal path being thermally and mechanically connected to all of the orifices of the second set of orifices, on one side, and the peripheral border of the support element, on the other side,
- the second thermal path is the only thermal path situated between the second set of orifices and the peripheral border of the support element,
- the first thermal path is the only thermal path situated between the first set of orifices and the second set of orifices,
- the first set of orifices comprises a number of orifices of between two and ten, the second set of orifices comprising a number of orifices of between two and ten,
- the two spaced-apart walls of each thermal path which extend in a longitudinal direction are cylindrical,
- the support element comprises a hole provided for communication of the volumes situated on either side of the support element,
- the support element comprises or consists of at least one of the materials selected from: stainless steel, a nickel-chromium metal alloy or superalloy, notably an alloy sold under the trade name Inconel®,
- at least a part of the peripheral border of the support element is secured to a sleeve or ring forming an interface for mounting the support element on a structural element, said support element being housed at least partially in said ring.

The invention also relates to a cryogenic fluid circuit comprising a plurality of pipes for transferring cryogenic fluid(s) at given respective temperatures, said pipes extending through respective orifices of a support element, the support element being in accordance with any one of the features above or below.

According to other possible particular features:

- the pipes extending through the orifices of the first set of orifices are intended to transport cryogenic fluids at temperatures that are relatively lower than the temperatures of the cryogenic fluids intended to be transported by the pipes extending through the orifices of the second set of orifices,
- the pipes extending through the orifices of the first set of orifices are intended to transport cryogenic fluids at similar temperatures, that is to say that have a temperature difference of between zero and 50 K, and preferably at temperatures of between 2 K and 10 K,
- the pipes extending through the orifices of the second set of orifices are intended to transport cryogenic fluids at similar temperatures, that is to say that have a temperature difference of between zero and 200 K, and preferably at temperatures of between 80 K and 110 K,
- the pipes for transferring fluids are housed in a volume under vacuum delimited by an outer casing, and in that the support element is disposed transversely in the volume under vacuum, the pipes being fixed to said support element,
- the support element is secured to a partition that separates two volumes kept at identical or different pressures, notably a partition of a refrigeration unit or a cryogenic fluid distribution unit.

The invention also relates to a method for retaining a plurality of cryogenic pipes passing through a partition via a support element comprising orifices provided for the passage of respective pipes, the method comprising a step of grouping a first set of pipes conveying fluids at first temperatures at a first set of respective orifices of the support element and a step of grouping a second set of pipes conveying fluids at second temperatures at a second set of respective orifices of the support element, wherein a first thermal path is disposed between the first and second sets of orifices of the support element (1), and a second thermal common path is disposed around the second set of orifices (2) of the support element, and in that the first temperatures are lower than the second temperatures.

The invention can also relate to any alternative method or device comprising any combination of the features above or below.

BRIEF DESCRIPTION OF THE FIGURES

Further particular features and advantages will become apparent from reading the following description, which is given with reference to the figures, in which.

DETAILED DESCRIPTION OF THE INVENTION

Figure 1:
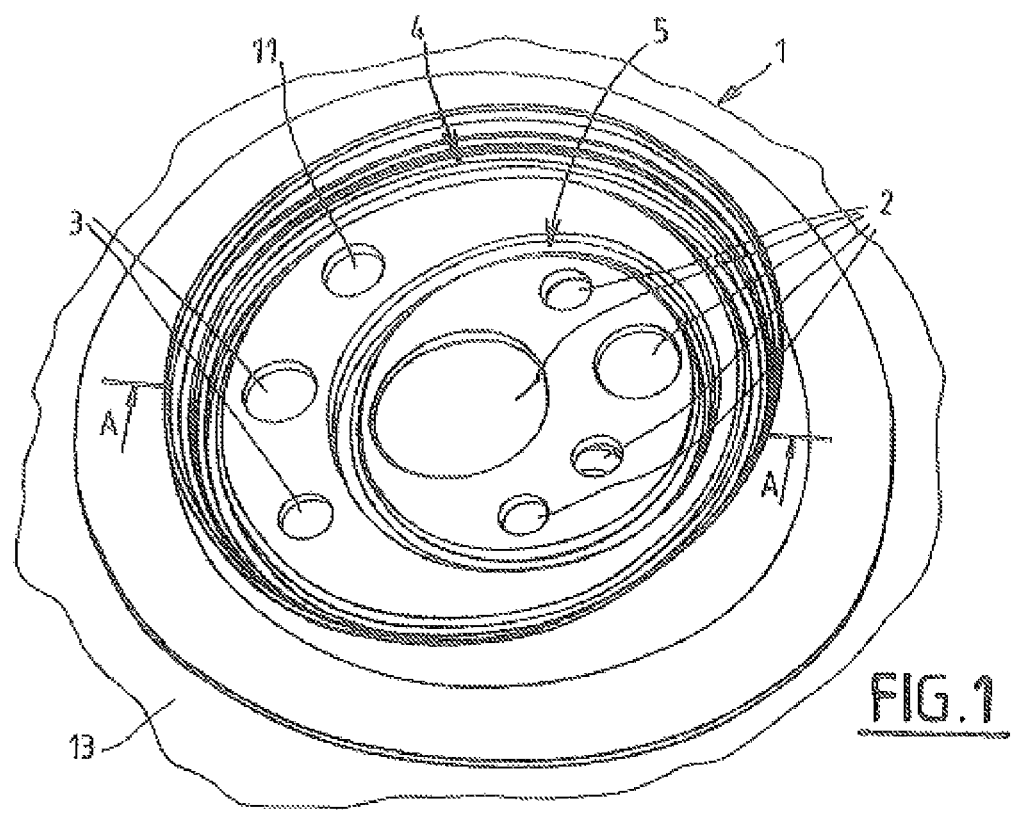
FIG. 1 shows a top perspective view of a schematic and partial exemplary embodiment of a support element disposed in a partition or a cryogenic fluid circuit.

The support element 1 in FIG. 1 is installed for example in a partition 13 that separates two separate volumes (at temperatures and pressures that can be different or the same).

The partition 13 can be for example a partition of a refrigeration unit or of a cryogenic fluid distribution unit of a refrigerator and/or of a liquefier or any other appropriate appliance.

Figure 2:
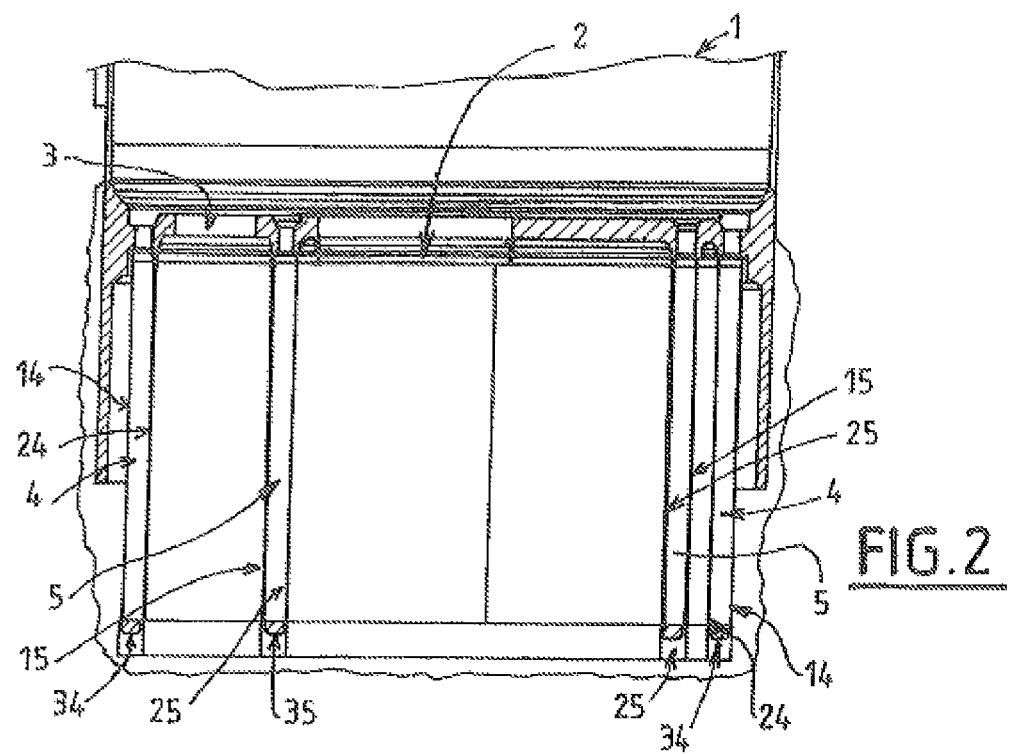
FIG. 2 shows a view of a longitudinal section along the line AA of the support element in FIG. 1.
Figure 3:
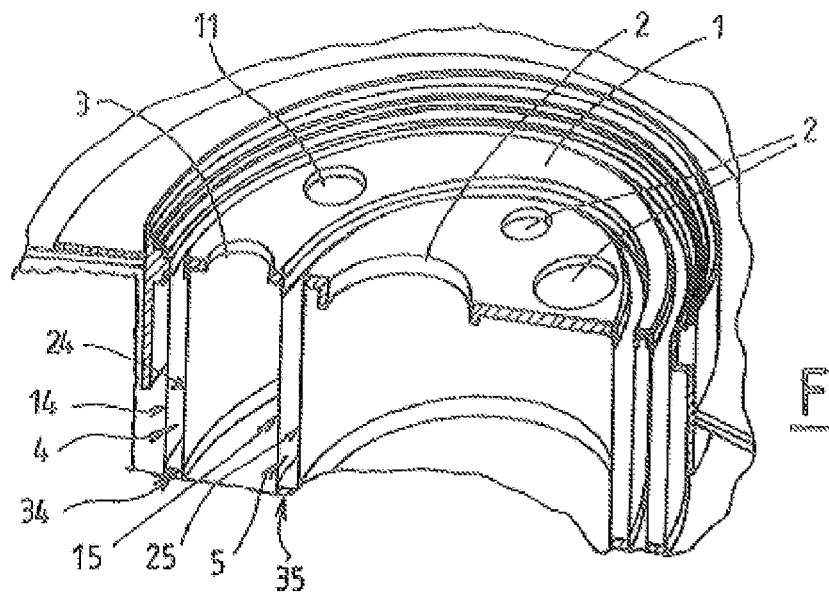
FIG. 3 shows a perspective view of a longitudinal section along the line AA of the support element in FIG. 1.
Figure 4:
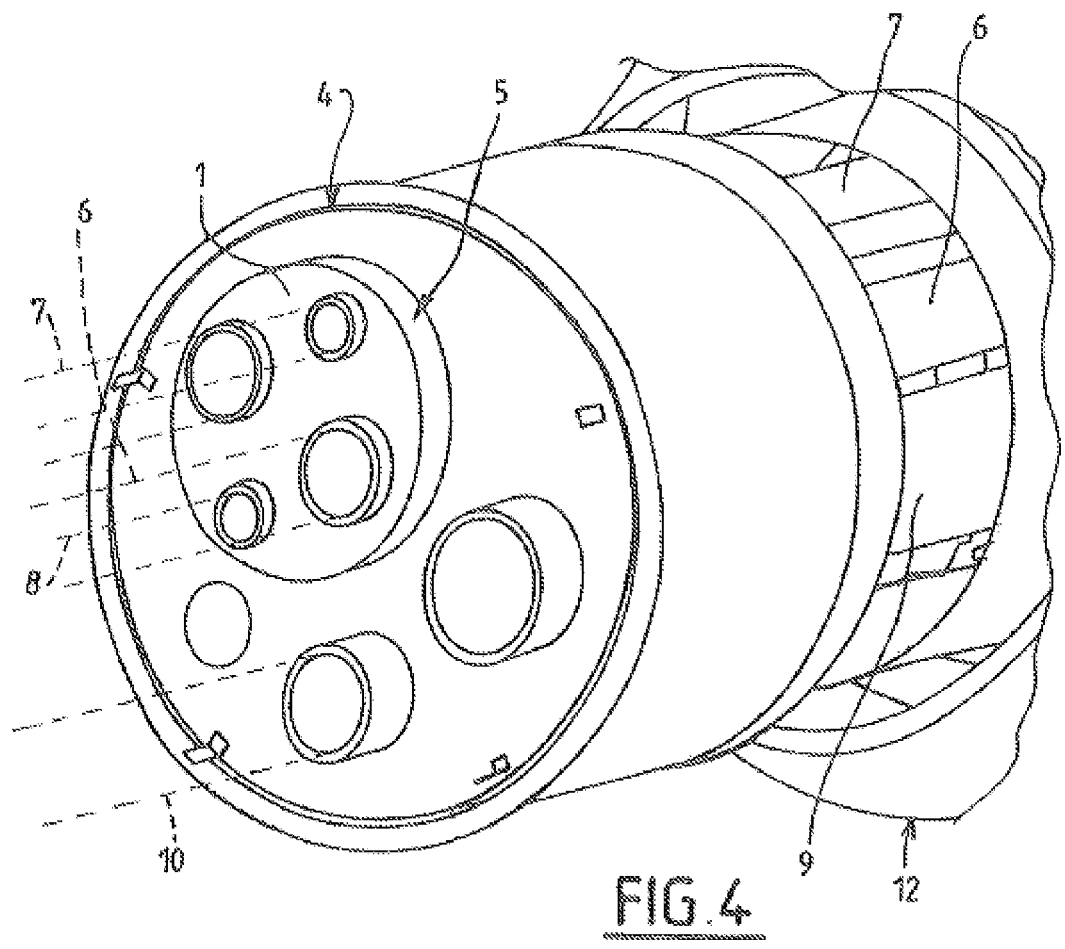
FIG. 4 shows a perspective, schematic and partial view of an exemplary use of a support element according to the invention in a circuit comprising several cryogenic pipes insulated under vacuum.

The support element 1 for a cryogenic fluid circuit shown in FIGS. 1 to 3 comprises a plurality of orifices 2, 3 each provided for the passage of a respective pipe for transferring cryogenic fluid (cf. FIG. 4). The orifices 2, 3 are preferably situated in one and the same plane or in parallel planes.

More specifically, the support element 1 comprises a first set of central orifices 2 surrounded by a first thermal path 5 and a second set of peripheral orifices 3 disposed between the first thermal path 5 and a second thermal path 4.

The second thermal path 4 is disposed around the second set of orifices 3, between the second set of orifices 3 and a (for example circular) peripheral border of the support element 1. These qualifiers "first" and "second" do not presuppose a chronological order in the transfers of calories or frigories. The qualifiers "first" and "second" for denoting the thermal paths 5 and 4 are chosen arbitrarily in accordance with their concentric order (radially from the center to the outside of the support element 1 in the plane of the orifices 2, 3).

The first thermal path 5 is common to all of the central orifices 2 of the first set of orifices 2 and to all of the orifices 3 of the second set of orifices 3. This means that the two ends of the first thermal path 5 are mechanically and thermally connected to the first set of orifices 2 and to the second set of orifices 3, respectively. "Mechanically connected" means for example that the thermal path is mechanically connected (directly, for example by welding) to the portion of sheet metal provided with the orifices 2, 3 in question. "Thermally connected" means for example that conduction is possible directly between the thermal path and the portion of material provided with the orifices 2, 3 in question.

Similarly, the second thermal path 4 is common to all of the orifices 3 of the second set of orifices 3. This means that the two ends of the second thermal path 4 are mechanically and thermally connected to the second set of orifices 3 and to the peripheral border of the support element 1, respectively.

This means that thermal transfers by conduction between any of the first, central orifices 2 and any of the second, peripheral orifices 3 necessarily pass only via the first thermal path 5 (a single thermal path between these two sets). Similarly, thermal transfers by conduction between any of the second, peripheral orifices 3 and the outside (periphery) of the support element 1 necessarily pass only via the second thermal path 4 (a single thermal path between these two entities).

In addition, thermal transfers between any of the first orifices 2 and the outside (periphery) of the support element 1 necessarily pass via the first 4 thermal path and the second 5 thermal path 4.

As can be seen in FIGS. 2 and 3, each thermal path 4, 5 formed between two entities comprises a blind duct that is delimited by two parallel, spaced-apart walls 14, 24; 15, 25 and an end wall 34, 35.

The two spaced-apart walls 14, 24; 15, 25 of one and the same thermal path extend between two longitudinal ends perpendicularly to the plane(s) of the orifices 2, 3. For example, for the first thermal path 5, the first, upstream ends (toward the top in FIGS. 1 to 3) of the two spaced-apart walls 15, 25 are respectively connected to the two adjacent sets of orifices 2, 3. More specifically, the first, upstream ends of the walls 15, 25 can be connected respectively to two plates of material (sheet metal for example) which comprise the first and the second set of orifices 2, 3, respectively.

The second, downstream ends (toward the bottom in FIGS. 1 to 3) of the two walls 15, 24 are connected together via a transverse end wall 35.

For the second thermal path 4, the first, upstream ends (toward the top in FIGS. 1 to 3) of the two spaced-apart walls 14, 24 are connected to the periphery of the support element and to the second set of orifices 3 (for example likewise via a plate), respectively.

As illustrated in the example of FIG. 2, the first, upstream end of the longitudinal wall 14 situated at the periphery can be connected (for example by welding) to a sleeve or an outer ring 16 surrounding the support element. This ring 16 (preferably made of material of the same type as the support element) can stiffen the support element and can notably serve as an interface for mounting on a structure of a circuit.

The second, downstream ends (toward the bottom in FIGS. 1 to 3) of the two walls 14, 24 are connected together via a transverse end wall 34.

The pairs of spaced-apart walls 14, 24; 15, 25 are preferably cylindrical and concentric. The transverse spacing between the two walls is for example between 7 and 50 mm.

The support element 1 and its various plates and thermal paths 4, 5 can consist of welded stainless steel or any other metal material or the like that is compatible with cryogenic temperatures.

In a preferred and advantageous manner, the first set of orifices 2 is provided for the passage of pipes that transport relatively colder fluid(s) at similar temperatures. For example, the temperature difference between the fluids passing through the different first orifices 2 is between zero and 50 K. For example, the first orifices 2 receive pipes for fluids at temperatures of between 3 K and 10 K.

The second set of orifices 3 can for its part be provided for the passage of pipes that transport relatively warmer fluid (compared with the first orifices 2). For example, the temperature difference between the fluids passing through the different second orifices 3 is between zero and 200 K. For example, the second orifices 3 receive pipes for fluids at temperatures of between 80 K and 100 K.

According to the solution proposed, the coldest pipes can be grouped at the center of the support element 1 (first orifices 2) while the relatively warmer pipes are disposed around this center (second orifices).

Thus, common outlet is provided in the support element 1 for all the fluids in a grouping with similar temperatures. Each peripheral tube or pipe (second set of orifices 3) is insulated by a thermal path 4 (long path for temperature equalization) which can be welded to a support plate that groups tubes with similar temperatures. This peripheral intermediate plate is itself mounted on a thermal path 5 that connects it to a central adjacent plate supporting tubes with different temperatures (first set of orifices 2).

The first set of orifices 2 can comprise a number of orifices 2 of between two and ten (for example five in the example in FIG. 1). Similarly, the second set of orifices 3 comprises a number of orifices 3 of between two and six (for example two in the example in FIG. 1).

As illustrated in FIG. 1, a hole 11 can be provided in the plate gathering the second set of orifices 3. This hole 11 is not intended to take a fluid pipe but can be provided to allow communication between the volumes situated on either side of the support element.

As illustrated in FIG. 4, the support element 1 can be used in a cryogenic circuit of one or more pipes insulated under vacuum.

The support element 1 is for example housed in a volume under vacuum that is delimited by an outer casing 12. The plurality of pipes 6, 7, 8, 9, 10 for transferring fluids are housed in a volume under vacuum and connected (preferably rigidly) to the support element 1. The support element 1 is disposed transversely in the volume under vacuum and forms a fixed point for the pipes 6, 7, 8, 9, 10.

While having a simple structure and being inexpensive, the support element 1 according to the invention makes it possible to effectively extend the thermal path between the parts of the circuit at different temperatures so as to negatively affect the temperatures of the transported fluids less. In addition, the arrangement of the pipes according to their temperature makes it possible to dispose cold pipes (temperatures of between 300 K and 80 K) between the hot periphery (for example 300 K) of the support element, on one side, and the colder pipes of the first orifices 2 (temperatures of between 80 K and 3 K for example).

The pipes passing through the second 3 orifices 3 can notably be used for "thermalizing", i.e. ceding frigories to the system between the hot peripheral part and the colder central part. This makes it possible to better guarantee the temperature of the colder pipes passing through the first orifices 2.

The structures described above make it possible notably to reduce thermal losses compared with the prior art.

The architecture makes it possible to create a temperature map with the coldest pipes at the center and the warmest pipes toward the outside of the junction. This makes it possible to create a temperature gradient which minimizes the negative effects for the different circuits.

In addition, the device thus has greater mechanical strength, notably greater resistance to axial forces and to the bending moment. This is notably on account of the increase in the inertia of the shells (tubes) of the thermal paths 4, 5. This arrangement requires fewer holes in the casing or outer partition. The structure claimed also makes it possible to reduce the manufacturing cost of the device.

Of course, the invention is not limited to the example described above. For example, it may be possible to provide three or more than three sets of orifices, where two adjacent sets are separated by one or more common thermal paths.

Similarly, the concentric distribution of the various pipes in the orifices can be modified as needed in groups of similar temperatures.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A support element for a cryogenic fluid circuit comprising a plurality of orifices provided for the passage of a respective plurality of pipes for transferring cryogenic fluid, said plurality of orifices comprising first and second sets of orifices, said support element comprising at least one thermal path formed between two adjacent ones of the plurality of orifices, the at least one thermal path comprising a first thermal path, the first set of orifices being surrounded by the first thermal path and the second set of orifices, the orifices of the first and second sets of orifices being situated in one and the same plane or in parallel planes, the orifices of the first and second sets of orifices being formed in first and second plates of material, respectively, the first and second plates of material in which the first and the second set of orifices are respectively formed being parallel and situated in one and the same plane or in separate parallel planes, the first thermal path comprising a blind duct formed between the two adjacent ones of the plurality of orifices, the blind duct being delimited by first and second spaced-apart walls, the first wall having associated first and second ends and extending between its associated first and second ends in a longitudinal direction perpendicular to the plane or planes of the orifices, the second wall having associated first and second ends and extending between its associated first and second ends in a longitudinal direction perpendicular to the plane or planes of the orifices, each of the first ends of the walls being connected to an associated one of the two adjacent ones of the plurality of orifices, each of the second ends of the walls being connected together via an end wall, the first thermal path being situated between the first set of orifices and the second set of orifices, such that the first thermal path is thermally and mechanically connected to all of the orifices of the first set of orifices, on one side of the first thermal path, and all of the orifices of the second set of orifices, on another side of the first thermal path.

2. The support element of claim 1, wherein the orifices of the second set of orifices are situated in the same plane as or in a plane parallel to the orifices of the first set of orifices.

3. The support element of claim 1, wherein the at least one thermal path further comprises a second thermal path, the second thermal path being disposed between the second set of orifices and a peripheral border of the support element, the second thermal path being thermally and mechanically connected to all of the orifices of the second set of orifices, on one side, and the peripheral border of the support element, on the other side.

4. The support element of claim 3, wherein the second thermal path comprises a blind duct formed between the second set of orifices and the peripheral border, said blind duct of said seconds thermal path being delimited by first and second spaced-apart walls, the first wall of the blind duct of the second thermal path having associated first and second ends and extending between its associated first and second ends in a longitudinal direction perpendicular to the plane or planes of the orifices, the second wall of the blind duct of the second thermal path having associated first and second ends and extending between its associated first and second ends in a longitudinal direction perpendicular to the plane or planes of the orifices, the first ends of the first and second walls of the blind duct of the second thermal path being connected to a peripheral border of the support element and to the second set of orifices, respectively, the second ends of the first and second walls of the blind duct of the second thermal path being connected together via an end wall.

5. The support element of claim 3, wherein the second thermal path is the only thermal path situated between the second set of orifices and the peripheral border of the support element.

6. The support element of claim 1, wherein the first thermal path is the only thermal path situated between the first set of orifices and the second set of orifices.

7. The support element of claim 1, wherein the first set of orifices comprises a number of orifices of between two and ten, and in that the second set of orifices comprises a number of orifices of between two and ten.

8. The support element of claim 3, wherein each of the first and second spaced-apart walls of the first thermal path and of the second thermal path are cylindrical.

9. The support element of claim 1, wherein the support element further comprises a hole provided for communication of the volumes situated on either side of the support element.

10. A cryogenic fluid circuit comprising a plurality of pipes for transferring cryogenic fluid(s) at given respective temperatures, each of said pipes extending through a respective orifice of the support element of claim 1.

11. The circuit of claim 10, wherein each of the pipes extending through the orifices of the first set of orifices are intended to transport cryogenic fluids at temperatures that are relatively lower than the temperatures of cryogenic fluids intended to be transported by each of the pipes extending through the orifices of the second set of orifices.

12. The circuit of claim 11, wherein each of the pipes extending through the orifices of the first set of orifices are intended to transport cryogenic fluids at similar temperatures, that is to say that have a temperature difference of between zero and 50 K.

13. The circuit of claim 10, wherein the pipes for transferring fluids are housed in a volume under vacuum delimited by an outer casing, and in that the support element is disposed transversely in the volume under vacuum, and in that the pipes are fixed to said support element.

14. A refrigeration unit that includes the circuit of claim 10, wherein the support element is secured to a partition of the refrigeration unit that separates two volumes of the refrigeration unit kept at identical or different pressures.

15. A method for retaining a plurality of cryogenic pipes passing through a partition via the support element of claim 3, comprising the steps of:
grouping a first set of pipes, of said plurality of cryogenic pipes, conveying fluids at first temperatures at the first set of respective orifices of the support element; and
grouping a second set of pipes, of said plurality of cryogenic pipes, conveying fluids at second temperatures at the second set of respective orifices of the support element, wherein the first thermal path is disposed between the first and second sets of orifices of the support element, and in that the second thermal path is disposed around the second set of orifices, and in that the first temperatures are lower than the second temperatures.

16. A cryogenic fluid distribution unit that includes the circuit of claim 10, wherein the support element is secured to a partition of the cryogenic fluid distribution unit that separates two volumes of the cryogenic fluid distribution unit kept at identical or different pressures.

* * * * *